Patented Apr. 10, 1928.

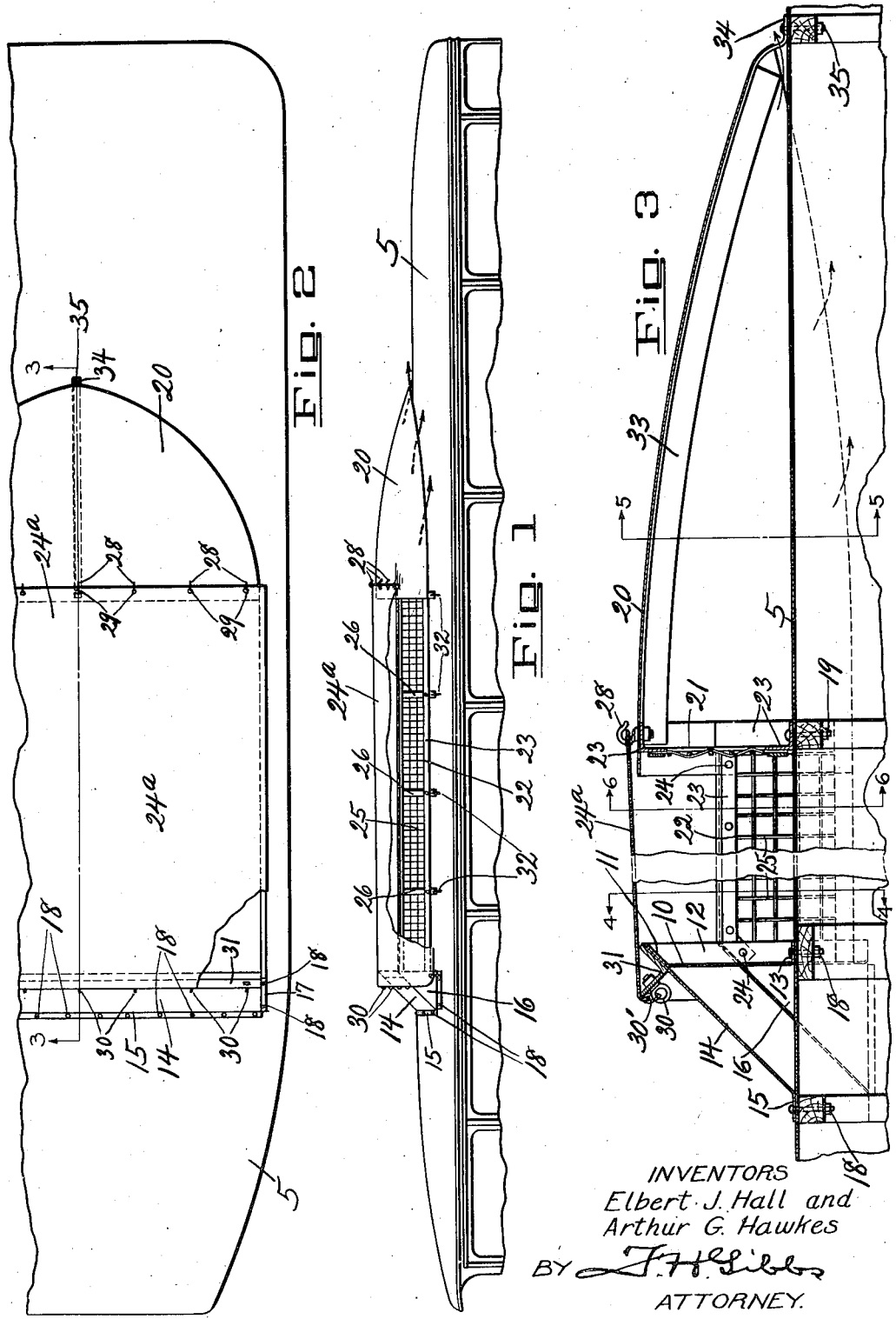

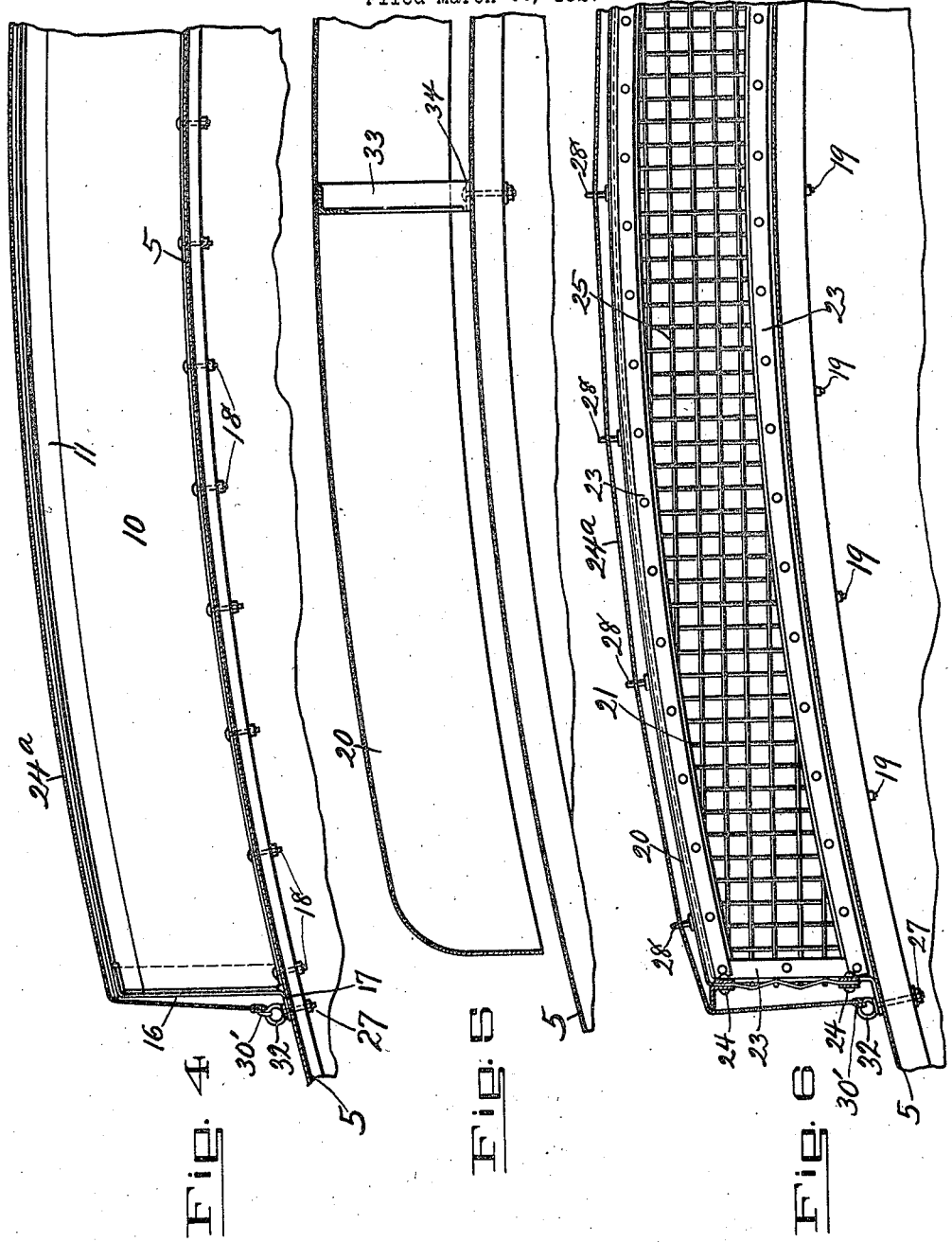

1,665,358

UNITED STATES PATENT OFFICE.

ELBERT J. HALL AND ARTHUR G. HAWKES, OF DETROIT, MICHIGAN, ASSIGNORS TO AMERICAN CAR AND FOUNDRY MOTORS COMPANY, OF NEW YORK, N. Y., A CORPORATION OF DELAWARE.

BAGGAGE RACK FOR MOTOR VEHICLES.

Application filed March 30, 1927. Serial No. 179,577.

This invention relates to baggage racks or carriers for motor vehicles, and more particularly to devices of this character for carrying baggage upon the roof of motor buses.

The accompanying drawings illustrate the preferred form of the invention, though it is to be understood that the invention is not limited to the exact details of construction shown and described, as it is obvious that various modifications thereof within the scope of the claims will occur to persons skilled in the art.

In said drawings:

Fig. 1 is a fragmentary side elevation of a motor bus embodying our improved baggage rack or carrier and having parts of the tarpaulin broken away;

Fig. 2 is a fragmentary top plan view of a motor bus equipped with our improved baggage rack or carrier;

Fig. 3 is an enlarged longitudinal sectional view taken on the line 3—3 of Fig. 2;

Fig. 4 is a fragmentary transverse vertical sectional view taken on line 4—4 of Fig. 3;

Fig. 5 is a similar view taken on line 5—5 of Fig. 3, and

Fig. 6 is a like view taken on line 6—6 of Fig. 3.

The principal object of our invention is to provide a baggage rack which will give a maximum protection to the baggage against dust and inclement weather and retain small packages and flat articles, such as brief cases, against loss.

A further object of the invention resides in the provision of a baggage rack or carrier which will keep the baggage intact from dust and inclement weather, and is so constructed as to offer but a minimum of air resistance.

The invention also contemplates a baggage carrier embodying a flexible cover or tarpaulin which, when secured in position over the baggage, will adhere to the same instead of becoming inflated and thereby caused to tear or break from its securing means.

Another object of the invention is to provide a baggage rack of this character wherein the flexible cover or tarpaulin is retained close to the baggage and bus roof by means of a vacuum produced by air currents passing therethrough incident to the high velocity of the bus.

Referring to the invention in detail, a conventional bus top is designated at 5 and mounted adjacent its forward end and extending transversely of the bus is a sheet metal wall or baggage abutment 10 having a flange 11 at its upper end extending obliquely with respect to the horizontal, side flanges 12 and a base flange 13 resting upon the top 5. To prevent air resistance, an angularly disposed sheet metal hood 14 having side walls 16 is arranged in advance of the wall 10 and has its upper end welded or otherwise secured to the flange 11. At its base the hood is bowed to conform to the shape of the top 5 and terminates in a lateral flange 15 resting upon the latter. Lateral flanges 17 are formed upon the lower ends of the side walls 16 and also rest upon the top 5. Suitable fastenings 18 secure the flanges 13, 15 and 17 to the bus top.

Arranged rearwardly of the hood 14 in longitudinal alinement therewith is a semi-elliptical in plan concavo-convex shell 20, having a rounded top wall which tapers rearwardly in a downward direction and whose side walls taper rearwardly and merge into the top wall. This particular configuration of the shell permits it to lie close to the roof 5, stream lining the latter and thus reduces air resistance to a minimum degree. Secured within the wide or inner end of the shell 20 and extending entirely across the same in parallel relation to the wall or abutment 10 is a railing or abutment wall 21, the latter being secured to the top 5 by fastenings 19.

Side railings or baggage abutment walls 22 extend from the opposite sides of the shield 14 to the opposite sides of the shell 20 and cooperate with the walls 10 and 21 in retaining the baggage on the roof 5. These railings or walls 21 and 22 each comprise an angle iron frame 23 having their ends attached to the flanges 12 and side walls of the shell 20, respectively, by fastenings 24, and a sheet of stout woven metal fabric 25 stretched across the frame and attached thereto. Vertical brackets 26 are attached to the frames of the walls or railings 22 and are secured to the roof 5 by eye bolts 27.

The present invention contemplates the use of a flexible canvas or tarpaulin to extend from the hood 14 to the shell 20 to overlie, retain and protect the baggage against the elements, and to that end we provide a dust and water proof flexible cover or tarpaulin 24ª.

In order to secure the front and rear ends of the cover or tarpaulin a plurality of upstanding hooks 28 is carried along the inner upper edge of the shell for engagement with eyelets 29 in the rear end of the cover or tarpaulin. A longitudinal row of laterally projecting eyes 30 is carried by a V-shaped in cross section bar 31 extending across and attached to the upper edge of the shield 14. Flexible elements 30' are carried along the forward transverse edge and longitudinal edges of the cover or tarpaulin and are engageable with the eyes 30 and eyes 32 of the eye bolts 27 respectively to secure the cover in position on the baggage.

For the purpose of preventing the cover or tarpaulin from "ballooning up" due to the air currents incidental to the high velocity at which the bus travels and hence tear the cover or tarpaulin from its fastenings, we propose to provide means whereby air beneath the tarpaulin is permitted to escape to the atmosphere from beneath the shell 20, tending to create a vacuum beneath the cover whereby the latter is prevented from "ballooning" and is retained in its normal covering position. In other words, this invention contemplates the provision of means for preventing the building up of air pressure beneath the tarpaulin whereby the pressure of the outside air will retain the tarpaulin in close engagement with the baggage in the rack. To provide for this, the shell 20 is supported on a bracket 33 with its lower edges disposed above the roof 5 to permit air currents to pass through the shell in a direction indicated by the arrows in Figs. 1 and 3. The bracket 33 is longitudinally curved and extends from a central point of the upper edge of the frame 21 in a downwardly and rearwardly direction and terminates in a foot 34 resting upon the roof 5 and secured thereto by a fastening 35.

With our invention the cover or tarpaulin is not only held down on the baggage but it is possible to carry small or flat articles, such as brief cases, without danger of losing the same.

It will also be observed that all danger of the tarpaulin breaking or tearing loose from its fastenings is obviated due to the fact that air currents that may pass through the tarpaulin will travel through the shell and egress from the rear thereof and tend to create a vacuum beneath the tarpaulin, thus retaining the latter in its normal position and permitting it to closely engage the baggage rack or the articles therein. The invention is applicable to all types of passenger carrying vehicles and is particularly adapted to interurban buses.

What is claimed is:

1. In a baggage retainer for high speed vehicles, a flexible sheet arranged to overlie and secure baggage placed upon the roof of the vehicle and held down upon the baggage as the result of vacuum produced beneath the sheet by air currents induced by travel of the vehicle.

2. In a baggage retainer for motor vehicles, a rack for attachment to the top of the vehicle, a flexible cover secured over the rack, and means associated with the rack to permit air currents to pass rearwardly from the same to create a vacuum under the cover whereby the cover is retained against the baggage by the pressure of the outer air.

3. In a baggage rack for vehicles, a plurality of upstanding walls adapted to confine baggage upon a vehicle roof, a flexible cover to be secured over the baggage, and means at the rear of the rack for permitting the escape of air currents to create a vacuum under the cover and thereby obviate inflation thereof.

4. In combination, a vehicle roof, baggage abutments secured thereto for retaining baggage therebetween, a flexible cover to extend parallel to the roof and overlie the baggage, and means permitting the escape of air from beneath the cover to prevent inflation thereof.

5. In combination with a motor vehicle and baggage retaining abutments on the roof thereof, a flexible cover arranged to be secured over baggage supported on the roof and held down upon the same as the result of vacuum produced beneath the cover incidental to air currents while the vehicle is in motion.

6. In combination, a motor vehicle, means for retaining baggage on the roof thereof, including a flexible cover normally stretched over the baggage, and means at the rear of the cover for permitting the escape of air from beneath the cover to cause the latter to assume a taut condition.

7. In combination, a motor vehicle, a baggage rack supported thereon and open at the top, a flexible cover closing the open top, and means for permitting the escape of air from beneath the cover whereby to retain it in a taut condition.

8. In combination, a vehicle roof, a plurality of baggage abutments carried thereby, a flexible cover stretched across the abutments to overlie the baggage, and a hollow member arranged at the rear of the cover and having communication with the atmosphere whereby to allow air currents passing through the cover to escape to the atmosphere tending to create a vacuum beneath the cover whereby the cover is retained against the baggage by the pressure of the outer air.

9. In a baggage rack for motor vehicles, a base upon which the baggage rests, an upstanding baggage enclosure on the base, a cover stretched across the enclosure and means for permitting the escape of air from beneath the cover whereby to prevent inflation of the latter.

10. In a baggage carrier, an upstanding baggage enclosure to be supported on a vehicle top, and having its upper end open, a flexible cover stretched across the enclosure overlying the open top, and a hood extending from the enclosure and open to the atmosphere to permit escape of air from beneath the cover to prevent building up air pressure beneath said cover whereby to prevent inflation of the latter.

11. In a baggage carrier, a baggage enclosure to be supported on the top of a vehicle and having its upper end open, a flexible cover stretched across the open top, and a hollow member arranged at the rear of the enclosure and having communication with the atmosphere and enclosure so that air currents passing through the cover incident to the vehicle travel will pass through the hollow member creating a vacuum within the enclosure to prevent inflation of the cover.

12. In combination, a vehicle top, and side railings supported thereon for confining baggage therebetween, an air deflecting hood arranged in advance of the forward end railing, an air passage leading from the rear railing communicating with the atmosphere and baggage carrying space defined by the railings, and a flexible cover detachably secured to the railings, the passage serving to conduct air currents that may pass through the cover to the atmosphere thereby preventing the building up of air pressure beneath the cover.

13. In a baggage carrier for motor vehicles, a baggage enclosure including a plurality of upstanding rails, a concavo-convex air passage arranged at the rear of the enclosure and having communication with the atmosphere, and a flexible cover attached to the enclosure and retained against inflation as the result of vacuum produced therebeneath caused by air currents passing through the conduit.

14. In a baggage rack, front and end members, side members connected therewith, a flexible cover overlying the side and end members, and means for permitting the exhaust of air from beneath the cover for retaining the cover against inflation.

15. In combination, a vehicle roof, a baggage rack supported thereon including end members and side members connected together, and a flexible sheet stretched across the end of the side members, the rear end member being hollow and having its edges spaced from the roof whereby air currents passing through and out of the cover will be conducted through such rear end member to eliminate air pressure beneath the cover whereby the latter is retained against inflation.

16. In combination, a vehicle top, a baggage rack thereon including a front end member, a semi-elliptical in plan, rear end member having its edges spaced from the roof to permit air currents to pass beneath the former, and a flexible cover secured on the front and rear end members, said rear end member being so formed as to permit the escape of air from beneath the cover whereby the latter is retained against inflation.

17. In a device of the kind described, a baggage rack, a cover for the same, and means for preventing the building up of air pressure beneath the cover whereby the latter is retained in close covering engagement with the rack.

18. In a motor vehicle, a baggage rack secured to the roof thereof, a cover therefor, and means for discharging air from beneath the cover during travel of the vehicle to prevent building up of air pressure beneath said cover whereby the latter is urged to close covering engagement with the rack by outside atmosphere.

19. In a motor vehicle, a baggage rack secured to the roof thereof, a flexible cover therefor, and a rear end member extending from said rack and secured to the roof, said rear end member being so formed as to discharge air therethrough from beneath the cover during travel of the vehicle whereby to prevent the building up of air pressure beneath said cover to restrain the latter against inflation.

In witness whereof we have hereunto set our hands.

ELBERT J. HALL.
ARTHUR G. HAWKES.